United States Patent [19]

Beierle et al.

[11] Patent Number: 5,106,390
[45] Date of Patent: * Apr. 21, 1992

[54] GASIFICATION PROCESS USING A MULTI-LAYER REACTION BED, TO DESTROY TOXIC MATERIAL AND PRODUCE SYNTHESIS GAS

[75] Inventors: Frederick P. Beierle, Prosser, Wash.; Mounir Mazzawi, Weymouth, Mass.

[73] Assignee: American Power and Waste Management Ltd., Vancouver, Canada

[*] Notice: The portion of the term of this patent subsequent to Nov. 28, 2006 has been disclaimed.

[21] Appl. No.: 439,098

[22] Filed: Nov. 20, 1989

Related U.S. Application Data

[63] Continuation-in-part of Ser. No. 191,209, May 6, 1988, Pat. No. 4,883,499.

[51] Int. Cl.⁵ .............................. C10J 3/06; C10J 3/14
[52] U.S. Cl. .................................... 48/197 R; 48/203; 48/209; 201/20; 201/34; 201/36; 423/DIG. 20
[58] Field of Search ............. 48/203, 209, 197 R; 423/DIG. 20; 201/25, 20, 21, 34, 36

[56] References Cited

U.S. PATENT DOCUMENTS

| | | | |
|---|---|---|---|
| 3,746,521 | 7/1973 | Giddings | 48/209 |
| 4,421,524 | 12/1983 | Chittick | 48/209 |
| 4,530,702 | 7/1985 | Fetters et al. | 48/209 |
| 4,781,944 | 11/1988 | Jones | 423/DIG. 20 |

*Primary Examiner*—Joye L. Woodard
*Attorney, Agent, or Firm*—Jensen & Puntigam

[57] ABSTRACT

An improve gasification system, in which synthesis gas is produced through the operation of a fuel gas production bed comprising an upper layer (66) of organic input material, typically in the form of pellets or briquettes of substantially uniform size and configuration which in one embodiment includes toxic waste material, two intermediate layers, one intermediate layer (70) for carbonizing the input material, and the other intermediate layer (72) for partially oxidizing and substantially completely pyrolyzing the input material and a lower layer (68) of tar-free charcoal. The length of the gas production bed from the top of the upper intermediate layer to the point where gas exits from the gas production bed is approximately at least 1.5 times the diameter of the bed, but not less than 7 feet. The residence time of the input material in the intermediate layers and the lower layers is such that activated carbon may be produced and/or the toxic waste input destroyed.

7 Claims, 3 Drawing Sheets

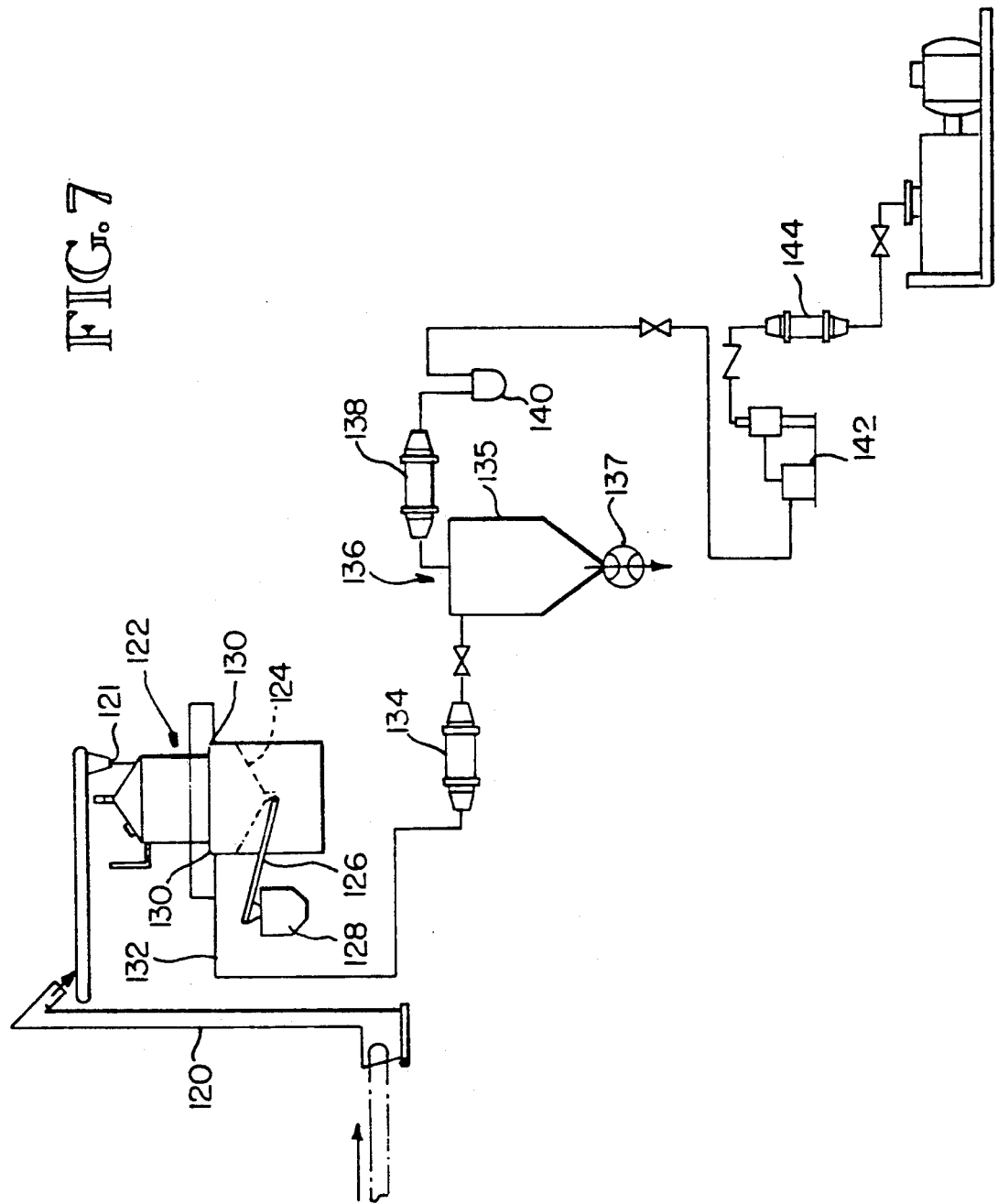

GASIFICATION PROCESS USING A MULTI-LAYER REACTION BED, TO DESTROY TOXIC MATERIAL AND PRODUCE SYNTHESIS GAS This application is a continuation-in-part of application Ser. No. 191,209, filed May 6, 1988, now U.S. Pat. No. 4,883,499, titled Gasifier Adapted To Generate Activated Carbon, in the names of Frederick P. Beierle, et al.

TECHNICAL FIELD

This invention relates generally to the art of gasification, in which synthesis fuel gas is produced from organic input material by a pyrolysis reduction process and more particularly concerns a gasification process in which toxic material such as PCBs and PCPs are destroyed, in addition to the production of synthesis gas.

BACKGROUND ART

The general concept of gasification of organic input material is relatively well known, including pyrolysis gasification in which organic input material undergoes a chemical and physical change to charcoal in the absence of a flame, producing in the process fuel gas such as carbon monoxide and hydrogen, in addition to other volatiles. A disadvantage to many gasification systems, including those incorporating a pyrolysis reduction process, is that tars and other undesirable volatiles are produced during the process. These volatiles are present in the synthesis gas and make the gas undesirable, as well as fouling the equipment for producing the gas.

Some information is known relative to controlling tars and pyrolysis volatiles, including, among others, controlling the particular configuration of the gas reduction bed, the temperatures of the various layers in the reduction bed, and the character and arrangement, including size, of the input material. Illustrative of this body of knowledge is U.S. Pat. No. 4,530,702, in the name of Fetters, et al, titled Method for Producing Fuel Gas From Organic Material, Capable of Self-Sustaining Operation.

However, there are still presently many unknowns concerning the reliable production of essentially tar-free fuel gas. For instance, it is not completely understood what are the significant process control features and/or characteristics of the gas production bed which tend to prevent creation of tars and other volatiles and to maintain efficient operation of the gasifier.

In addition, a typical by-product of the gasification process is the production of charcoal. This charcoal typically must be periodically removed from the gasifier and disposed of, in some fashion. Unfortunately, the market for charcoal produced by conventional gasification systems is uncertain and disposal problems thus sometimes exist. This increases the overall expense of the gasification system, due to a lack of adequate return on the charcoal produced.

DISCLOSURE OF THE INVENTION

The present invention is a process which is adapted to destroy selected toxic material and produce synthesis gas. The process includes the step of establishing a reaction bed in a closed gasifier reaction chamber, the gas production bed comprising in sequence an upper layer of organic input material which includes selected toxic material in controlled amounts, an intermediate pyrolysis layer in which the input material is gradually reduced to charcoal, with volatiles being released from the input material, and a lower layer of substantially tar-free charcoal, wherein substantially all the volatiles from the intermediate layer are reduced to carbon monoxide, methane and hydrogen, and wherein the toxic material is destroyed. The intermediate layer is at a temperature of 850° to 950° C., and the lower layer includes an upper portion which is also at the temperature of 850° to 950° C. Oxygen-containing air is moved down through the gas production bed to sustain the operation of the bed. Additional organic material is added to the gasifier chamber to maintain the upper layer of the bed. The operation of the bed is such that the input material remains in the intermediate layer and the lower layer approximately at least six to ten hours.

BRIEF DESCRIPTION OF THE DRAWINGS

FIG. 7 is a simplified representational view of a gas production system which includes the gasifier of FIG. 1.

BEST MODE FOR CARRYING OUT THE INVENTION

Figure 1:
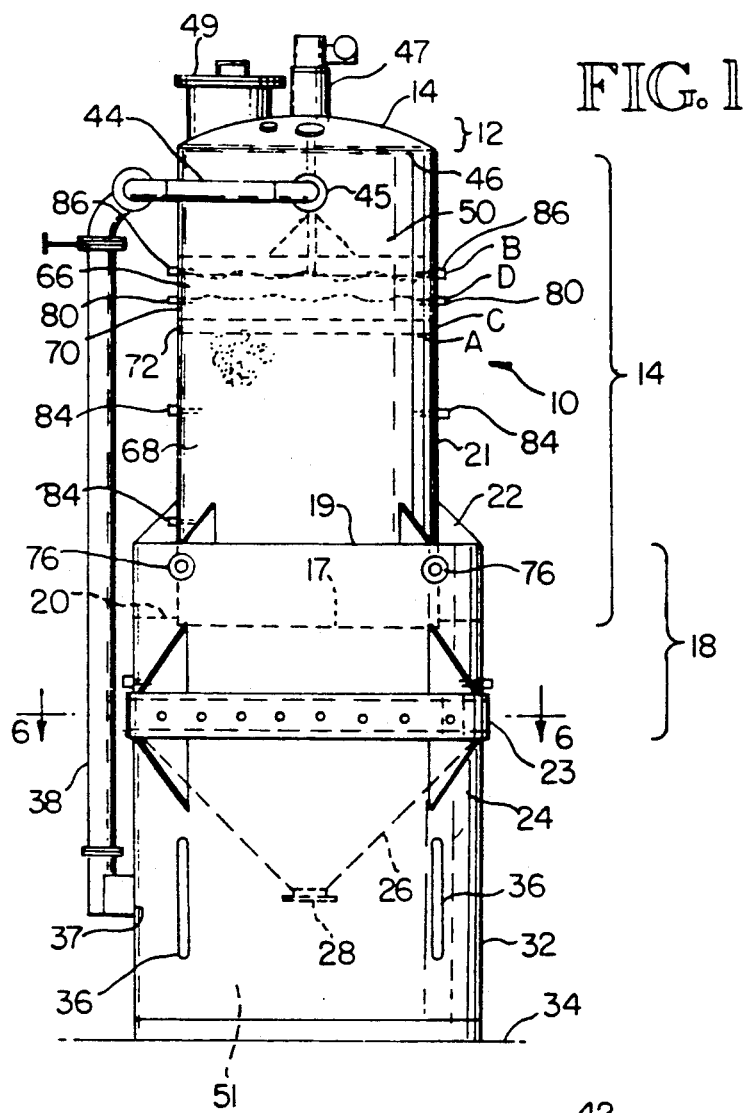
FIG. 1 is an elevational view showing the gasifier of the present invention.
Figure 2:
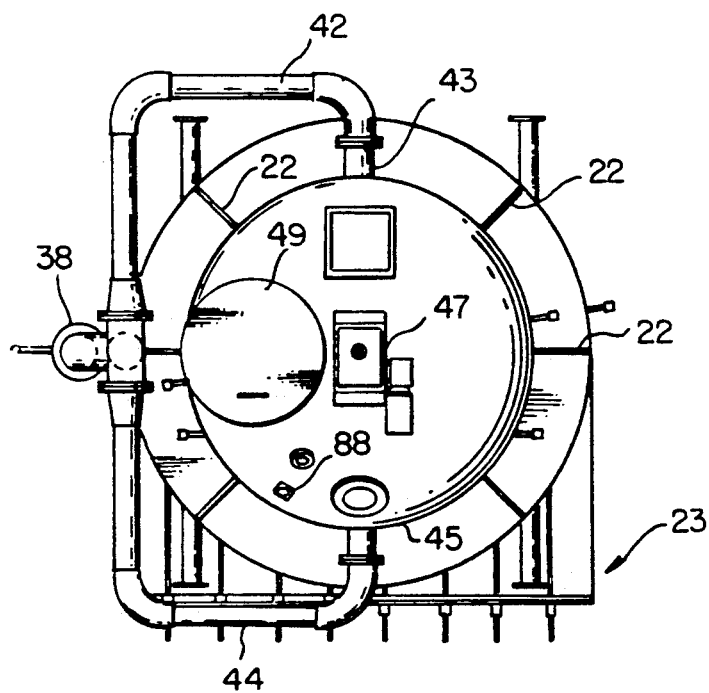
FIG. 2 is a top plan view of the gasifier of FIG. 1.

FIG. 1 shows an elevational view of a gasifier apparatus in which the gasification process of the present invention may be carried out. The gasifier, referred to at 10, is generally cylindrical, and in the embodiment shown is approximately 23 feet high. In the embodiment shown, the gasifier is constructed from ½ inch stainless steel, but this could be varied, as long as the structure has the required strength. The main body of the gasifier includes a top portion 12 which has a slightly concave upper surface 14. The top portion 12 in the embodiment shown is approximately 15 inches high, at its point of greatest height. A middle portion 14 of the gasifier main body is cylindrical and extends downwardly from the upper portion for approximately 11 feet. The diameter of gasifier main body in the middle portion 14 is approximately 6 feet 4 inches, over the entire length of the middle portion 14.

Surrounding the lower part of the middle portion 14 of the main body of the gasifier is a lower portion 18 which extends from a point approximately 1 foot 9 inches above the lower end 17 of the middle portion 14 downwardly approximately 4 feet. The lower portion 18 is also cylindrical, and in the embodiment shown has a diameter of approximately 8 feet, seven inches. Approximately 2 inches above the lower end 17 of the middle portion 14 of the gasifier main body is a screen ring 20 which extends between the middle portion 14 and the lower portion 18 of the gasifier main body. In the embodiment shown, the screen ring 20 has openings approximately 3/16 inch in diameter.

A plurality of triangular gussets 22-22 in the form of vertical flat plates extend around the periphery of the gasifier main body between the horizontal upper surface 19 of lower portion 18 and the vertical exterior surface 21 of the middle portion 14, primarily for purposes of structural strength and integrity.

At the lower end of lower portion 18 is a removable star valve assembly 23. Immediately below the star valve assembly 23 is positioned a cone-shaped portion 26 which in the embodiment shown has an angle 24 of 60°, although this could be varied. Typically, however, the angle should be greater than 45°. The cone-shaped portion 26 has a height of approximately 3 feet 10 inches from its base to its apex. At the bottom (apex) of the cone-shaped portion 26 is an opening 28 approximately one foot in diameter.

Surrounding the cone-shaped portion 26 is a cylindrical shield 32 which extends from the location of the star valve assembly 23 downwardly to the ground 34. The supporting shield 32 provides the vertical support for the main body of the gasifier. The support shield 32 has a plurality of vertical slots 36-36 therein around the periphery thereof, the slots 36-36 in the embodiment shown being approximately 3 feet high by approximately 3 inches wide.

Extending from an opening 37 in the support shield 32 at right angles thereto for a short distance and then upwardly along the side of the gasifier is an air conduit 38. In the embodiment shown, air conduit 38 is an 8 inch diameter steel pipe. At the top of the air conduit 38 it divides into a two horizontal sections 42 and 44, which extend around the gasifier and are connected to the gasifier body at two points 43, 45 approximately 180° removed from each other. The horizontal sections 42 and 44 in the embodiment shown are 6 inch diameter steel pipe. The horizontal sections enter the gasifier slightly below the upper edge 46 of the middle portion 14 of the gasifier body. The air conduit 30 provides the flow of air necessary for the operation of the gasifier, as more fully explained hereinafter.

The organic input material is provided to the gasifier 10 through an intake assembly 47 at the very top of the gasifier. The organic input material, such as wood, other organic waste products, sawdust, etc., when it enters the gasifier is substantially uniform in size and configuration, and will be symmetrical as far as possible. The input material has a moisture level which is approximately in the range of 8-14% by weight. The thickness of the input material in one dimension (and in all dimensions if the input element is completely symmetrical) should be approximately 1% of the diameter of the gasifier ±0.25%, although the smallest size will typically be approximately 3/16 inch.

FIG. 1 shows the configuration of the gas production bed during operation of the gasification process of the present invention. With respect to start-up of the process, an initial charge of carbon (charcoal) is positioned in the gasifier. Preferably, the initial charge of charcoal is substantially tar-free. Typically this initial charge of charcoal will be a remainder from previous processing. The charcoal will typically extend from the lower end of the gasifier upwardly to a level designated as A in FIG. 1. This charcoal is then ignited. When ignition has been accomplished such that the temperature of the charcoal is substantially uniform across the cross-sectional area of the gasifier, the organic input material is fed through the inlet assembly 47 at the top of the gasifier.

As explained above, the input material is preferably in the form of briquettes or pellets. The pelletized/briquetized input, prior to introduction thereof, is typically stored in a hopper and then moved by conveyor or similar device to the inlet assembly 47 of the gasifier. The input material, upon entry into gasifier, falls on top of the heated lower charcoal layer, which acts as a base material, with the top of the input material being approximately at a level designated as B in FIG. 1.

Figure 4:
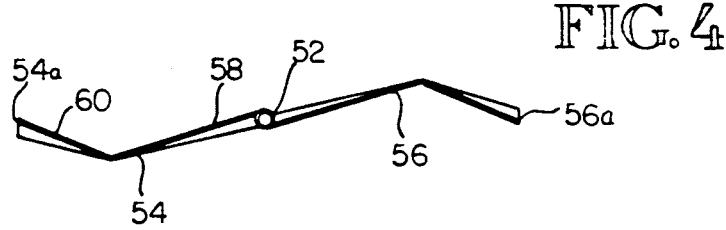
FIG. 4 is a top plan view showing the leveling arm used in the gasifier of FIG. 1.
Figure 5:
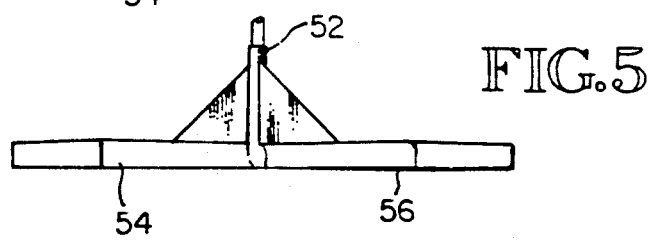
FIG. 5 is a side elevational view of the leveling arm of FIG. 5.

A leveling arm assembly shown generally at 50 in FIG. 1 and more particularly in FIGS. 4 and 5, located in the vicinity of the upper surface of the input material, is rotated to spread the input material uniformly over the cross-sectional area of the gasifier. This uniform spreading of the input material insures substantially uniform air diffusion and uniform downward movement of air over the cross-sectional area of the gasifier, resulting in a substantial reduction, if not elimination, of channeling, which refers to openings between adjacent input elements which permit flow of air therethrough, causing hot spots and a lack of a uniform temperature profile. This in turn results in the production of tars and other undesirable volatiles.

The leveling arm assembly 50 comprises a vertical shaft 52 and two relatively narrow extending arms 54 and 56 which extend outwardly from the vertical shaft 52 at the lower end thereof, such that the far ends 54a, 56a of the two extending arms 54 and 56 are substantially adjacent the internal surface of the gasifier. Each extending arm is approximately 4 inches high and extends for approximately 3 feet 1 inch from the vertical shaft. Each extending arm is angled in configuration, comprising two straight sections 58 and 60, as exemplified in extending arm 54. The first straight section 58 is approximately 24 inches long, and the second section 60 is approximately 15 inches long, with the second section 60 being at an angle of approximately 160° relative to the first section. The far ends 54a, 56a of the extending arms lead the arms when the leveling arm assembly 50 is rotated clockwise.

The second straight section 60 is also angled slightly from the vertical, approximately 30° in the embodiment shown. For clockwise rotation, the upper edge of the far end 54a of the straight section 60 is the leading edge. This particular configuration permits an ease of sweeping the input material to produce a substantially uniform level thereof. Triangular gussets 62-62 are secured between the upper edge of the extending arms and the vertical shaft, for purposes of strength and rigidity.

During the gasification process, air is moving upwardly through air conduit 38 through the horizontal sections 42 and 44 into the top of the gasifier and down through the gas production bed. The air is heated because it is drawn from the chamber 51 enclosed by protective support shield 32. The heated charcoal in the cone-shaped portion 26 of the gasifier body heats the air in the chamber 51. The organic input material positioned above the charcoal base material, i.e. between level A and level B, will limit the diffusion of air to the charcoal base material.

As air is moved down through the gas production bed, however, the upper part of the heated charcoal will first heat and then thoroughly ignite the lower portion of the input material. The gas production bed soon reaches steady state conditions, in which synthesis gas is produced.

At steady state conditions, the temperature of the charcoal base material, at least in the upper portion thereof, will be approximately 900° C. Typically the temperature will decrease somewhat in the lower regions. As one example, the temperature might vary from 875° C. at the top of the charcoal base material layer down to 725° C. near the star valve assembly. Within the input material, two discernable reaction layers will develop above level A, which is the top of the charcoal base material. The two reaction layers are shown as separated by a line designated as C in FIG. 1.

Thus, during steady-state operation, there is an upper layer 66 of basically unreacted input material, a lower layer 68 of hot charcoal which has been substantially completely reacted and two intermediate layers 70 and 72. In layer 70, which is approximately 4-6 inches in depth, the organic input material is carbonized, at a temperature within the range of 400° to 500° C. In this zone or layer, the temperature is low enough to prevent the formation of clinkers, while at the same time most of the volatiles will be driven off and synthesis gas produced. In layer 72, 1-6 inches deep, the input material undergoes partial oxidization with a controlled amount of air, to draw additional volatiles from the input material. Complex hydrocarbons are typically released in this layer. The partial oxidation of the organic material in this layer raises the temperature of the material to approximately 900° C. The organic material is surrounded by carbon dioxide and other gases and in the process of releasing further volatiles, the input material changes into activated carbon. The high temperatures in this layer are sufficient to crack the complex hydrocarbons as well as some of the volatiles and water vapor produced. By the time the input material moves all the way through layer 72, it has been substantially completely pyrolized and is in the form of activated carbon. The input material passes through layer 72 fairly slowly. Typically, movement of the input material through this layer and layer 68 requires 6-10 hours. The remaining pyrolysis volatiles and any tars pass from layer 72 into the partially activated carbon base material layer 68. At the bottom edge of layer 72, the input material now in the form of activated carbon, becomes part of the base material layer.

Within the charcoal base layer, the upper part of which is typically maintained at a temperature of 875° C. -900° C., all remaining tars and other undesirable pyrolysis volatiles will decompose into combustible gases. The hydrocarbons will decompose to carbon monoxide, hydrogen and methane, while some hydrocarbons will react with oxygen to become carbon dioxide and water vapor. Any remaining traces of tars left in the gas will be filtered out by the remainder of the charcoal base layer, i.e. the charcoal may absorb those remaining volatiles. The fuel gas exits from the gasifier through exit ports 76-76. The effectiveness of the gasification process in general is enhanced by a particular length of the gas production bed. The distance between level B, at the upper end of the pyrolysis zone, and the point at which the gas exits the gasifier is at least 1.5 times the diameter of the gasifier, but in any event not less than seven feet.

The production of synthesis gas and activated carbon is a continuous process, comprising the introduction of input material at the top of the gasifier and the continuous partial oxidization and pyrolysis of the input material, produced by the movement of oxygen-containing air downwardly through the production bed, both of which are controlled in a manner described in more detail below.

During operation of the gasification process, the level of activated charcoal in the gasifier will gradually rise, i.e. level A gradually rises within the gasifier. This will raise the layers 70 and 72 upwardly correspondingly, until layer 70, which is typically at a temperature of approximately 500° C., reaches the level of thermocouples or temperature probes 80-80. The material in layer 66 is substantially cooler than 500° C. When layer 70 reaches the level of temperature probes 80-80, the charcoal base material layer 68 is lowered by the removal of charcoal therefrom. The charcoal removed from the gasifier is activated carbon. This is accomplished through the use of a star valve assembly 23 which is shown representationally in FIG. 1 and in more detail in FIG. 3, and described in more detail below.

The star valves, when operated, cause the charcoal base layer 68 to drop or lower uniformly over the cross-sectional area of the gasifier. The uniform lowering of the gas production bed tends to prevent channeling, hot spots, etc. developing in the bed, which create problems in reliable, consistent gasification operation. The star valves continue to operate until level D, the top of layer 70, is below the level of temperature probes 80-80, since layer 66, being substantially unreacted, is at a significantly lower temperature than that of layer 70, i.e. approximately 300° C. Thus the temperature probes 80-80 differentiate between layers 66 and 70.

Sensors 86-86, typically in the form of a conventional electric eye, are located above temperature probes 80-80. Once the upper surface of the input material layer 66 moves below the line of sight of sensors 86-86, the input material is moved through the inlet assembly until the line of sight of sensors 86-86 is again blocked.

In addition, there are other temperature probes 84-84 which are positioned throughout the gasifier at various levels within the area bounded by the activated charcoal base layer. If the temperature in the base layer is outside the desired range, either higher or lower, the amount of air moving through the production bed is controlled to bring the temperature back within the desired range. Also, in the embodiment shown, there is an oxygen analyzer 88 which extends into the void area between the upper surface of the input material in the gasifier and the very top of the gasifier. The results from the oxygen analyzer 88 can be used alone or in conjunction with the results from temperature probes 84-84 to control the input of air into the gasifier. The control of the air is accomplished by a butterfly valve 90. This can be done either automatically or manually.

The present invention has the advantage of producing activated carbon using the process described above. Activated carbon is characterized by an iodine number of at least 500. In order to achieve the desired iodine number, the carbon produced in the course of the process is removed from the gasifier at the rate of approximately 10-12% by weight relative to the amount of the organic input material supplied to the gasifier. Activated carbon is a valuable commodity and is typically not reliably produced in other gasification systems. By removing the carbon at the specified rate, the organic input material will spend sufficient time, i.e. approximately 6-10 hours, within layers 72 and 68 to be fully activated. Partial oxidation of the input material occurs in layer 72, thereby maintaining the temperature in the layer 70 within the specified range of approximately 500° C. and the temperature of the upper part of layer 68 at approximately 900° C.

Figure 3:
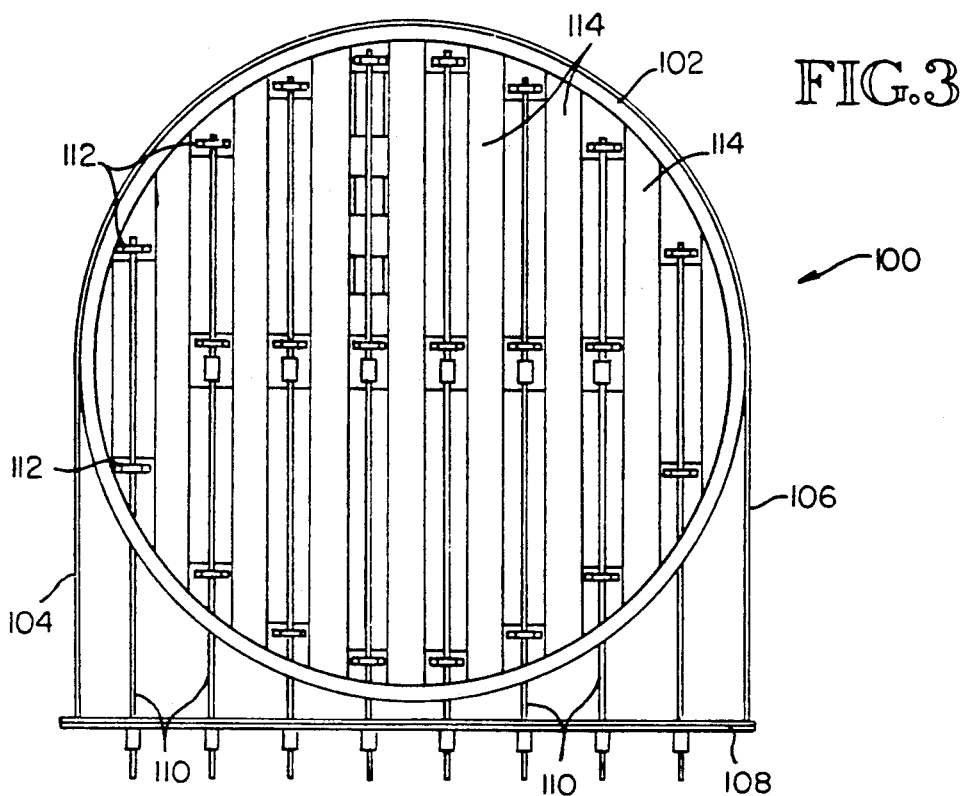
FIG. 3 is a top plan view showing the star valve system used in the gasifier of FIG. 1.

Referring now in more detail to FIG. 3, the star valve assembly of the present invention is shown. The star valve assembly in FIG. 3 is shown generally at 100. It includes a frame which in turn includes a circular ring 102 which in the embodiment shown is approximately 9 inches high and 8 feet, 6 inches in diameter. Extending forwardly from the circular ring 102 on opposite sides thereof and tangent thereto are parallel side braces 104 and 106, connected at their free forward ends by a front brace 108. Extending rearwardly from front brace 108 and supported by circular ring 102 are a plurality of mounting rods 110-110. In the embodiment shown, the mounting rods are on twelve inch center, and there are a total of eight mounting rods in the embodiment shown.

Supported on the mounting rods 110-110 within the area bounded by circular ring 102 are elongated paddle-like elements 112-112 which are star shaped in cross-section, approximately one inch in diameter and which extend substantially across the opening bounded by ring 102. Several of the star-shaped elements 112, however, comprise two portions, separated by a small distance, so that they are not continuous. The mounting rods 110-110 are supported for rotation by front brace 108 and ring 102 and are connected to conventional mechanical and electrical elements which result in their rotation, such as gears, belts, and the like.

Extending between the adjacent star-shaped paddle elements 112-112 are elongated blocking elements 114-114 which are circular in cross-section. The blocking elements come substantially adjacent to the edges of successive star shaped paddle elements 112-112. The spacing between the paddle elements 112-112 and the blocking elements 114-114 is such that only the finest material, such as carbon fines and ash, can move through the star valve assembly until the star-shaped paddle elements are operated. In operation, the star-shaped paddle elements 112 are rotated, moving charcoal into the cone-shaped section of the gasifier body. There are a sufficient number of the paddle elements to result in the charcoal bed lowering at a uniform rate across the cross-sectional area of the gasifier.

Although in the embodiment shown a total of eight star-shaped paddle elements are used, a fewer number will still provide the desired uniform lowering of the bed. However, the star shaped paddle elements should cover at least 25 percent of the cross-sectional area of the bed to provide the substantially uniform lowering. Also in the embodiment shown the star valve assembly is configured and arranged such that it may be inserted and removed into the gasifier as a unit. This is desirable for cleaning, repair and the like of the assembly. The gasifier itself is constructed with sufficient internal support elements to permit removal of the star-valve assembly.

Figure 6:
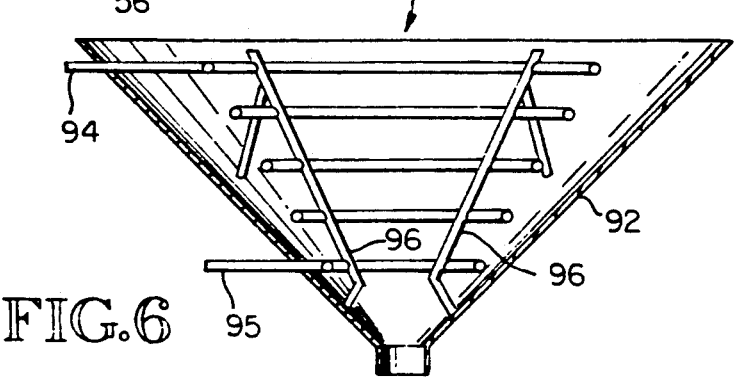
FIG. 6 is a cross-sectional view taken along the lines 6—6 in FIG. 1, showing the cooling tube arrangement used in the lower end of the gasifier.

FIG. 6 shows another feature of the present invention. The cone-shaped element 92 which corresponds to element 26 in FIG. 1 includes therewithin a set of cooling tubes shown generally at 93. In the embodiment shown, the cooling tube arrangement 93 comprises a tube or pipe arranged in successive rings, i.e. a spiral, with an increasing diameter in the upward direction, so that it tends to follow the configuration of the cone-shaped section 92. Entry and exit portions 94, 95 are provided at the top and bottom of the cooling tube assembly. The assembly 93 is supported within the cone-shaped element 92 by supports 96 which are connected to the interior surface of element 92. It should be understood that although the embodiment shown is in the form of a series of rings, the circular configuration can be approximated by a series of straight sections, for ease of manufacture.

In operation, cooling fluid is passed through the tubing, which results in the cooling of the charcoal in the cone-shaped element, making the charcoal easier to work with.

FIG. 7 shows in representational form the gas train system of the present invention. As explained above, but which is not shown in the figure, the input material or feed, in the form of carbon-containing briquetted or pelletized through conventional methods. The input material in the form of briquettes or pellets or the like is dried and then moved to a storage bin from where it is conveyed 120 to the input 121 to the pyrolysis gasifier 122, as explained in detail above.

During operation of the gasifier, both fuel gas, i.e. carbon monoxide, methane and hydrogen, as well as activated carbon, are produced, as-explained above. The activated carbon is moved from the gasifier at the bottom of the cone-shaped portion 124 by means of a screw conveyor 126 to a carbon hopper 128 from where it may be conveniently packaged or otherwise transported for sale. The fuel gas is drawn from the gasifier through exit ports 130-130 which extend from the gasifier at selected intervals around the periphery thereof. The gas from the exit ports are connected to an outlet pipe 132.

The synthesis gas at this point is at a temperature of approximately in the range of 500°-650° C. and is applied to a one-pass heat exchanger 134 which lowers the temperature of the gas to within the range of 250°-350° C. The one pass heat exchanger is important in the embodiment shown, since it avoids problems caused by precipitates such as potassium hydroxide which weakens the welds in the heat exchanger if the gas must move through an angled path.

The gas then is moved to a cyclone separator 136 which has an external jacket adapted to permit a flow of fluid, such as water, therethrough. The wall 135 of the separator 136 is cool, i.e. at a temperature of approximately 30°-40° C. Particulates such as silica and potassium hydroxide which are in the gas tend to precipitate in the cyclone because of the cold wall 135 and are removed therefrom at outlet 137. The temperature of the gas is also lowered to approximately within the range of 150°-200° C.

The synthesis gas then is moved to a second one-pass heat exchanger 138 where the gas is further cooled to approximately 30°-40°. The gas then is applied to a conventional gas filter 140, which in the embodiment shown is a cartridge filter which removes fine particulates from the gas. The gas then proceeds to a gas blower system 142 which draws the gas through the entire gasification system, including the pyrolysis gasifier. Blower system 142 is responsible for the flow of air and synthesis gas throughout the entire system. The blower system 142 compresses the gas and raises its temperature to approximately 100° C. In the embodiment shown, the pressure of the gas at this point is approximately 3 psi.

The gas is then applied to a third heat exchanger 144 which lowers the temperature of the synthesis gas back to 30°-40° C. The gas is then applied to an end-use system or apparatus, such as a gas engine or boiler. Thus, in the embodiment shown, the gas is cooled in a series of steps which includes a cool-wall cyclone adapted to remove undesirable particulates. The system has proven to be effective and produces a gas at a usable temperature and pressure.

Thus, an improved gasification system has been described with accurate and precise control, avoiding the formation of clinkers and tars and other volatiles in the gas. It also includes particular elements or assemblies, such as the star valve assembly and a cooling tube, which provide improved operation for the apparatus. The apparatus is also adapted to reliably produce activated carbon, i.e. carbon having an iodine number of at least 500, for which there is a substantial market.

The process of the present invention can also be used to destroy PCB (polychlorinated biphenyl) material, PCP (pentachlorophenol) material and other organic toxic material. It has been demonstrated that with the present invention, PCB destruction will reach 99.9999%, while for PCP the destruction is 99.999%. Other toxic material will likely have similar levels of destruction.

The toxic material to be destroyed may originally be in various forms, including a powder or liquid, or it may be imbedded in wood or soil. In each case the toxic material is first typically combined with non-contaminated organic material and formed into a briquette, pellet or similar form, hereinafter referred to as a pellet form. Non-contaminated organic material is thus the medium for the toxic material. For instance, if the toxic material is imbedded in existing wood, the wood is simply pelletized using normal procedures. If it is in soil, the toxic soil is typically mixed with organic material, such as wood, and then pelletized. If the toxic material is in the form of a powder or a liquid, it is typically mixed with ground or shredded organic material, such as sawdust, and the mixture is then compacted and pelletized. Typically, the range of impurities for the contaminated pelletized material, to achieve the purity results mentioned above, is 10 parts per million (ppm) to 5,000 ppm for PCBs and 10 ppm to 15,000 ppm for PCPs. The size, shape, and other characteristics for the input pellets are the same as described previously above.

After the input has been thus formed, it is fed into the gasifier in much the same way as described above; the reaction bed is also similar to that described above, i.e., an upper layer of unreacted input material, first and second intermediate layers and a lower layer of hot, substantially completely reacted charcoal. The contaminated input material moves through the intermediate layers and forms part of the lower layer, just like with conventional input material.

It is important that one intermediate layer, typically the lower one, be at a temperature of 850° to 950° C. This is the same temperature range which should be present in the upper regions of the lower layer. The upper intermediate layer in the reaction bed will typically be at a temperature of 400°-500° C.

Apart from the temperatures, however, it is particularly important that the residence time of the contaminated input material be within the previously described range of six to ten hours and, that the distance between the upper intermediate layer and the selected point where the synthesis gas exits from the gasifier is approximately 1.5 times the diameter of the reaction bed but not less than approximately seven feet.

Although the process can, in fact, be run to produce activated carbon, if desired, it is not essential that activated carbon be produced. Any activated carbon which is removed from the unit may be reused as input in the gasifier at a later time or may be burned in another unit. Tar-free synthesis gas is, of course, produced by the process and this gas may be used in any conventional gas burning system, such as a burner or engine. The gas is not contaminated and may be used for any conventional purpose. Any residue ash from the system may be either disposed by moving it to a land fill or the like or may be directed to a cyclone separator and then returned to the gasifier.

As mentioned above, use of the above-described contaminated input in the described process results in the destruction of PCBs to the extent of 99.9999%, and PCPs to the extent of 99.999%. These are considered to be acceptable, safe destruction levels.

One significant advantage of the disclosed system for destruction of toxic material is that the system can be completely portable, so that it can conveniently be moved to the site of the toxic material, instead of transporting the toxic material to the gasifier.

Although a preferred embodiment of the invention has been disclosed herein for illustration, it should be understood that various changes, modifications, and substitutions may be incorporated in such embodiment without departing from the spirit of the invention as defined by the claims which follow.

What is claimed is:

1. A process adapted to destroy toxic material and to produce synthesis gas, comprising the steps of:
   establishing a reaction bed having a top and a bottom and a selected diameter in a closed gasifier reaction chamber to produce synthesis gas, the reaction bed comprising, in sequence, as upper layer of organic input material which includes toxic material in controlled amounts, forming contaminated input material, at least one intermediate pyrolysis layer in which the contaminated input material is gradually reduced to charcoal and volatiles are released from the contaminated input material, and a lower layer of substantially tar-free charcoal, wherein the intermediate layer is a temperature within a range of 850° to 950° C., and wherein the contaminated input material has a residence time in the intermediate layer and the lower layer of approximately six to ten hours, such that the toxic material is destroyed and substantially all the volatiles from the intermediate layer are reduced to carbon monoxide, methane and hydrogen;
   adding additional contaminated input material to the reaction chamber in an amount sufficient to maintain the upper layer of the reaction bed; and
   moving air down through the reaction bed in a controlled amount so as to maintain the temperature of the intermediate layer within said range.

2. A process of claim 1, wherein synthesis gas exits from the reaction bed at a selected point, and wherein the distance betweem the one intermediate layer and the selected point is approximately 1.5 times the diameter of the reaction bed but not less than approximately seven feet.

3. A process of claim 1, wherein including the step of monitoring the amount of air moved down through the reaction bed in order to maintain the temperatures of the intermediate layer and the lower layer within selected ranges.

4. A process of claim 1, wherein the toxic material and the organic input material are together formed into pellet-like elements in which the contamination is within the range of 10 ppm -15,000 ppm.

5. A process of claim 4, when the input material elements are substantially uniform in size and configuration and are symmetrical along at least one axis, and wherein the thickness of the input material about said one axis is approximately 1% plus or minus 0.25% of the diameter of the reduction bed, but not less than 3/16 of an inch.

6. A process of claim 1, wherein the reaction bed includes a second intermediate layer above said one intermediate layer, said second intermediate layer being at a temperature within the range of 400° to 500° C.

7. A process of claim 1, wherein the process is carried out in a reaction chamber which is portable and may be conveniently moved from site to site.

* * * * *